(12) United States Patent
Hu

(10) Patent No.: US 12,540,832 B2
(45) Date of Patent: Feb. 3, 2026

(54) METHOD FOR OPERATING AND MAINTAINING AN ELECTRONIC MAP, METHOD FOR USING ELECTRONIC MAP DATA AND SERVICE SYSTEM

(71) Applicant: BOE Technology Group Co., Ltd., Beijing (CN)

(72) Inventor: Bocheng Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 215 days.

(21) Appl. No.: 18/282,334

(22) PCT Filed: Jan. 4, 2023

(86) PCT No.: PCT/CN2023/070400
§ 371 (c)(1),
(2) Date: Sep. 15, 2023

(87) PCT Pub. No.: WO2023/142924
PCT Pub. Date: Aug. 3, 2023

(65) Prior Publication Data
US 2024/0295412 A1 Sep. 5, 2024

(30) Foreign Application Priority Data
Jan. 29, 2022 (CN) .......................... 202210111748.3

(51) Int. Cl.
*G01C 21/00* (2006.01)
*G06F 9/50* (2006.01)
(52) U.S. Cl.
CPC ..... *G01C 21/3859* (2020.08); *G01C 21/3841* (2020.08); *G06F 9/5077* (2013.01)

(58) Field of Classification Search
CPC ............ G01C 21/3859; G01C 21/3841; G01C 21/3885; G06F 9/5077; G06F 16/29; G06F 9/45558; G06F 9/5027
See application file for complete search history.

(56) References Cited

U.S. PATENT DOCUMENTS 8,046,551 B1 * 10/2011 Sahin .................. G06F 12/0866
714/707
2016/0085645 A1 * 3/2016 Buzzard .............. H04L 67/1097
714/6.21

(Continued)

FOREIGN PATENT DOCUMENTS

CN 106844537 A * 6/2017
CN 107066296 A 8/2017

(Continued)

OTHER PUBLICATIONS

Machine translation for CN106844537A, Deng Shihu, Jun. 13, 2017.*
Machine translation for WO2021227564A1, Luo Ping, Nov. 18, 2021.*

*Primary Examiner* — Abdalla A Khaled
(74) *Attorney, Agent, or Firm* — WHDA, LLP

(57) ABSTRACT

A method for operating and maintaining an electronic map, a method for using electronic map data and a service system, which relate to a technical field of computer. The method includes: by the backend development device, acquiring target electronic map data to be updated, sequentially generating mirror data at different development stages, sequentially publishing the mirror data to the virtual cloud server cluster; wherein mirror data at the last development stage in the mirror data constitute new-version electronic map data, other mirror data in the mirror data except for the mirror data at the last development stage constitute old-version electronic map processing data, and then, by the virtual cloud (Continued)

server cluster, generating identification information corresponding to each of the mirror data, wherein the identification information is used to distinguish different mirror data.

20 Claims, 11 Drawing Sheets

(56) References Cited

U.S. PATENT DOCUMENTS

| | | | |
|---|---|---|---|
| 2018/0188034 A1* | 7/2018 | Duan | H04W 4/02 |
| 2018/0211157 A1* | 7/2018 | Liu | G06N 3/0455 |
| 2019/0065897 A1* | 2/2019 | Li | G06N 3/0464 |
| 2019/0146927 A1* | 5/2019 | Frolikov | G06F 12/0246 |
| | | | 711/103 |
| 2020/0241772 A1* | 7/2020 | Danilov | G06F 3/0689 |
| 2021/0034485 A1* | 2/2021 | Danilov | G06F 11/2094 |
| 2022/0333950 A1* | 10/2022 | Akbarzadeh | G01C 21/3804 |
| 2023/0116629 A1* | 4/2023 | Grymel | G06N 3/048 |
| | | | 706/15 |

FOREIGN PATENT DOCUMENTS

| | | | |
|---|---|---|---|
| CN | 111142879 A | | 5/2020 |
| CN | 111443923 A | | 7/2020 |
| CN | 114490073 A | | 5/2022 |
| JP | 2002-049624 A | | 2/2002 |
| WO | WO2021227564 A1 * | | 11/2021 |

* cited by examiner

METHOD FOR OPERATING AND MAINTAINING AN ELECTRONIC MAP, METHOD FOR USING ELECTRONIC MAP DATA AND SERVICE SYSTEM

The present disclosure claims the priority of the Chinese patent application filed on Jan. 29, 2022 before the China National Intellectual Property Administration with the application number of 202210111748.3 and the title of "ELECTRONIC MAP OPERATION AND MAINTENANCE METHOD, ELECTRONIC MAP DATA USE METHOD AND SERVICE SYSTEM", which is incorporated herein in its entirety by reference.

TECHNICAL FIELD

The present disclosure relates to the technical field of electronic devices and more particularly, to a method for operating and maintaining an electronic map, a method for using data of an electronic map and an electronic map service system.

BACKGROUND

With the diverse needs of smart life, the use of electronic maps becomes increasingly widespread. The current commonly used electronic map production process is to generate an original electronic map through a cartographic software and upload it to a map creator. Then, the map creator may develop based on the original electronic map and publish it to the server. The published new-version electronic map will directly replace the old-version electronic map in the server. When it is necessary to delete or merge areas on the electronic map based on the actual planning of the building, you may log in to the development platform of the map creator for operation.

SUMMARY

In a first aspect, the present disclosure provides a method for operating and maintaining an electronic map, applied to an electronic map service system, the electronic map service system includes a backend development device and a virtual cloud server cluster, the backend development device and the virtual cloud server cluster are connected in communication, and the method includes:
acquiring, by the backend development device, target electronic map data to be updated;
sequentially generating, by the backend development device, mirror data at different development stages corresponding to the target electronic map data;
sequentially publishing, by the backend development device, the mirror data to the virtual cloud server cluster, wherein mirror data at the last development stage in the mirror data constitute new-version electronic map data, other mirror data in the mirror data except for the mirror data at the last development stage constitute old-version electronic map processing data; and
generating, by the virtual cloud server cluster, identification information corresponding to each of the mirror data, wherein the identification information is used to distinguish different mirror data.

Optionally, the sequentially generating mirror data at different development stages corresponding to the target electronic map data includes:
sequentially generating branch data at different development stages corresponding to the target electronic map data;
packaging the branch data as a process file after generating one of the branch data every time; and
building the process file as the mirror data;
wherein the branch data at different development stages include development branch data, test branch data and pre-release branch data, and the mirror data at different development stages include development environment electronic map data mirroring, testing environment electronic map data mirroring and production environment electronic map data mirroring.

Optionally, the sequentially publishing the mirror data to the virtual cloud server cluster includes:
publishing the mirror data to the virtual cloud server cluster after building one of the mirror data every time.

Optionally, the branch data at the different development stages are stored in the project code warehouse of the backend development device, and the mirror data at the different development stages include a memory address of the project code warehouse and branch names corresponding to the mirror data;
the generating identification information corresponding to each of the mirror data includes:
determining a this-time timestamp of generating the identification information this time according to a current timestamp and a historical timestamp of generating the identification information last time;
encoding the this-time timestamp to obtain a first value;
for each of the mirror data, reading the memory address of the project code warehouse and the branch names corresponding to the mirror data from the mirror data;
generating a second value according to the memory address of the project code warehouse and the branch names corresponding to the mirror data; and
performing a combination or operation on the first value and the second value, to obtain the identification information corresponding to the mirror data.

Optionally, the determining a this-time timestamp of generating the identification information this time according to a current timestamp and a historical timestamp of generating the identification information last time includes:
determining whether a current first timestamp is less than the historical timestamp of generating the identification information last time; and
if the first timestamp is greater than or equal to the historical timestamp, determining a latest second timestamp as the this-time timestamp of generating the identification information this time.

Optionally, before the determining a this-time timestamp of generating the identification information this time according to a current timestamp and a historical timestamp of generating the identification information last time, the method further includes:
accumulating based on a historical sequence number corresponding to an operation of generating the identification information last time, to obtain a this-time sequence number corresponding to an operation of generating the identification information this time;
if the first timestamp is greater than or equal to the historical timestamp, determining a latest second timestamp as the this-time timestamp of generating the identification information this time, includes:
if the first timestamp is equal to the historical timestamp, determining whether the this-time sequence number is equal to a preset maximum value;

if the this-time sequence number is equal to the preset maximum value, blocking for a preset duration to release temporary resources, and determining the latest second timestamp as the this-time timestamp of generating the identification information this time; and if the this-time sequence number is less than the preset maximum value, determining the latest second timestamp as the this-time timestamp of generating the identification information this time.

Optionally, if the first timestamp is greater than or equal to the historical timestamp, determining a latest second timestamp as the this-time timestamp of generating the identification information this time, includes:

if the first timestamp is greater than the historical timestamp, setting the this-time sequence number to 0, and determining the latest second timestamp as the this-time timestamp of generating the identification information this time.

Optionally, after determining whether a current first timestamp is less than the historical timestamp of generating the identification information last time, the method further includes:

if the first timestamp is less than the historical timestamp, generating invalid identification information.

Optionally, generating a second value according to the memory address of the project code warehouse and the branch names corresponding to the mirror data includes:

hash encoding the memory address of the project code warehouse, to obtain a first hash value;

hash encoding the branch names corresponding to the mirror data, to obtain a second hash value, and obtain a second value including the first hash value and the second hash value;

the performing a combination or operation on the first value and the second value, to obtain the identification information corresponding to the mirror data includes:

performing a combination or operation on the first value, the first hash value and the second hash value, to obtain the identification information corresponding to the mirror data.

Optionally, after generating identification information corresponding to each of the mirror data, the method further includes:

configuring a corresponding data processing interface for each of the mirror data, wherein the data processing interface is used to add data, delete data, modify data, and search for data on the mirror data corresponding to the data processing interface.

In a second aspect, the present disclosure further provides a method for using electronic map data, applied to the electronic map service system of the method for operating and maintaining an electronic map according to the first aspect, wherein the electronic map service system further includes a business server cluster, the virtual cloud server cluster and the business server cluster are connected in communication, the method is configured to use the mirror data obtained by the method for operating and maintaining an electronic map according to the first aspect, and the method includes:

receiving, by the business server cluster, an electronic map download request sent by a user terminal;

by the business server cluster, in response to the electronic map download request, sending an acquisition request for the new-version electronic map data to the virtual cloud server cluster;

by the virtual cloud server cluster, in response to the acquisition request, sending the new-version electronic map data to the business server cluster; and sending, by the business server cluster, the new-version electronic map data to the user terminal.

Optionally, the method further includes:

detecting, by business server cluster, whether the virtual cloud server cluster has updates of the electronic map data by polling the virtual cloud server cluster;

by the virtual cloud server cluster, when new new-version electronic map data is obtained by updating, sending the new new-version electronic map data to the business server cluster; and by the business server cluster, when the new new-version electronic map data is received, sending prompt information to the user terminal, wherein the prompt information is used to prompt a terminal user to download the new new-version electronic map data, to update to the latest electronic map.

Optionally, the electronic map service system further includes a reverse proxy server cluster, and the business server cluster and the user terminal are connected in communication by the reverse proxy server cluster.

Optionally, the receiving, by the business server cluster, an electronic map download request sent by a user terminal, includes: receiving, by the reverse proxy server cluster, the electronic map download request sent by the user terminal; scheduling, by the reverse proxy server cluster, the electronic map download request to the target business server of the business server cluster according to a preset scheduling mechanism; and receiving, by the target business server, the electronic map download request;

by the business server cluster, in response to the electronic map download request, sending an acquisition request for the new-version electronic map data to the virtual cloud server cluster includes: by the target business server, in response to the electronic map download request, sending the acquisition request for the new-version electronic map data to the virtual cloud server cluster; and sending, by the business server cluster, the new-version electronic map data to the user terminal includes: sending, by the target business server, the new-version electronic map data to the reverse proxy server cluster; and sending, by the reverse proxy server cluster, the new-version electronic map data to the user terminal.

Optionally, the method further includes:

sending, by the business server cluster, a big data service request to the virtual cloud server cluster;

by the virtual cloud server cluster, in response to the big data service request, acquiring required relevant data from at least one of the mirror data;

performing, by the virtual cloud server cluster, data processing on the relevant data according to the big data service request, to obtain a processing result; and sending, by the virtual cloud server cluster, the processing result to the business server cluster.

Optionally, in response to the big data service request, acquiring required relevant data from at least one of the mirror data, includes:

in response to the big data service request, acquiring required relevant data from at least one of the mirror data according to addresses and ports of the mirror data in a local area network to which the virtual cloud server cluster belongs.

Optionally, the performing data processing on the relevant data includes:

performing data analysis on the relevant data through a data analysis model;

and/or, generating a visualization chart according to the relevant data.

In a third aspect, the present disclosure further provides an electronic map service system, wherein the electronic map service system includes a backend development device and a virtual cloud server cluster, and the backend development device is connected to the virtual cloud server cluster in communication;

the backend development device is configured for acquiring target electronic map data to be updated; sequentially generating mirror data at different development stages corresponding to the target electronic map data; and sequentially publishing the mirror data to the virtual cloud server cluster, wherein mirror data at the last development stage in the mirror data constitute new-version electronic map data, other mirror data in the mirror data except for the mirror data at the last development stage constitute old-version electronic map processing data;

the virtual cloud server cluster is configured for generating identification information corresponding to each of the mirror data, wherein the identification information is used to distinguish different mirror data.

Optionally, the electronic map service system further includes a business server cluster, and the virtual cloud server cluster and the business server cluster are connected in communication;

the business server cluster is configured for sending a computing service request to the virtual cloud server cluster;

the virtual cloud server cluster is further configured for, in response to the computing service request, acquiring relevant data required for computation from at least one of the mirror data; performing data analysis and processing on the relevant data according to the computing service request, to obtain an analysis result; and sending the analysis result to the business server cluster.

Optionally, the electronic map service system further includes a reverse proxy server cluster, the business server cluster includes a plurality of business servers, and the reverse proxy server cluster and each of the plurality of business servers are connected in communication; and the reverse proxy server cluster is configured for scheduling a request sent by a user terminal to one of the plurality of business servers of the business server cluster according to a preset scheduling mechanism.

The above description is merely a summary of the technical solutions of the present disclosure. In order to more clearly know the technological means of the present disclosure to enable the implementation according to the contents of the specification, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work.

DETAILED DESCRIPTION

In order to make the purpose, technical solutions and advantages of embodiments of the present disclosure clearer, the technical solutions according to the embodiments of the present disclosure will be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Unless otherwise defined, technical terms or scientific terms used in the present disclosure shall have the usual meaning understood by persons skilled in the art to which the present disclosure belongs. The terms "first", "second", and similar terms used in the present disclosure do not indicate any order, quantity, or importance, but are only used to distinguish different components. Similarly, similar words such as "a/an", "one", or "the" do not indicate a quantity limit, but rather indicate the existence of at least one. Words such as "including" or "comprising" refer to the components or objects that appear before the word, including the components or objects listed after the word and their equivalents, without excluding other components or objects. Words such as "connect" or "connection" are not limited to physical or mechanical connections, but can include electrical connections, whether direct or indirect. Positional words such as "up", "down", "left", and "right" are only used to represent relative positional relationships based on the attached drawings. When the absolute position of the described object changes, the relative positional relationship may also change accordingly.

Figure 1:
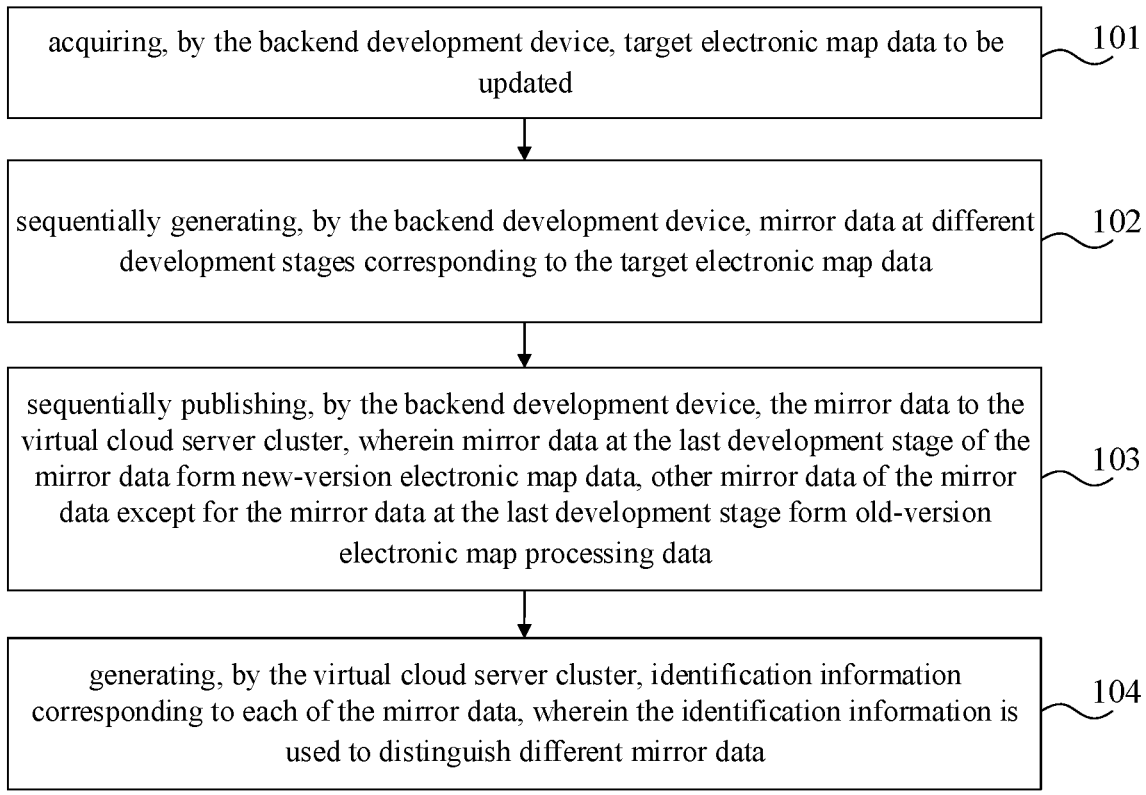
FIG. 1 illustrates a flow chart of steps of a method for operating and maintaining an electronic map according to an embodiment of the present disclosure.
Figure 2:
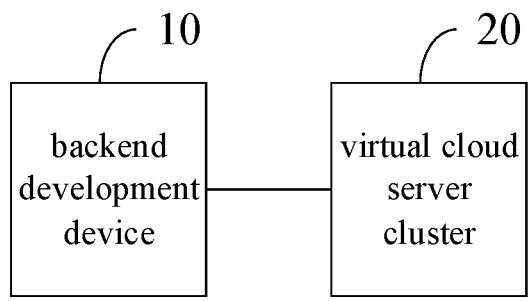
FIG. 2 illustrates a block diagram of an electronic map service system according to an embodiment of the present disclosure.

Referring to FIG. 1, which illustrates a flow chart of steps of a method for operating and maintaining an electronic map according to an embodiment of the present disclosure, and the method is applied to an electronic map service system. Referring to FIG. 2, the electronic map service system 100 includes a backend development device 10 and a virtual cloud server cluster 20, the backend development device 10 and the virtual cloud server cluster 20 are connected in communication.

In some embodiments, the backend development device 10 may be a device such as a terminal used by electronic map developers for backend development of electronic maps, and the embodiments of the present disclosure do not specifically limit this. It can be understood that in the embodiment of the present disclosure, the backend development device 10 may include at least one device.

In some embodiments, the virtual cloud server cluster 20 is a server cluster that can provide cloud services, which provides a virtualized environment. Among them, the virtual cloud server cluster 20 may provide cloud services based on a plurality of physical servers.

The method includes the following steps:
step 101: acquiring, by the backend development device, target electronic map data to be updated.

When creating an electronic map at the first time, the original electronic map can be drawn by using a map editor based on actual drawings of the building. Subsequently, relevant functions need to be developed based on the original electronic map, for example, identifying positioning devices such as a Bluetooth beacon. Therefore, the original electronic map is used as the target electronic map data to be updated.

In some embodiments, the backend development device may draw the original electronic map by using the map editor based on the actual drawings of the building. Certainly, the original electronic map may also be sent to the backend development device after being drawn on other devices or platforms. The embodiment of the present disclosure does not limit this.

When creating the electronic maps at the second time and subsequently, it is necessary to perform development such as optimization functions or map modifications based on the old-version electronic map data. Therefore, in this case, the latest-version electronic map data published last time will be used as the target electronic map data to be updated.

Optionally, the target electronic map data can specifically include vector data, road network data, and position data of some positioning devices (such as the Bluetooth beacon).

Further optionally, the area indicated by the target electronic map data may include at least some indoor areas and/or at least some outdoor areas, which are not limited by the embodiment of the present disclosure.

Step 102: sequentially generating, by the backend development device, mirror data at different development stages corresponding to the target electronic map data.

In a development process of the electronic map, the backend development device may develop the target electronic map data in three stages: a preliminary development stage, a testing stage, and a pre-release stage. In the preliminary development stage, relevant functions such as the target identification and the regional integration can be developed for the target electronic map. After the development is completed, it enters the testing stage. In the testing stage, functional testing can be performed on the target electronic map. After passing the test, it enters the pre-release stage. In the pre-release stage, the redundant data deletion and the final verification can be performed on the target electronic map data.

After each development stage is completed, the data obtained in this stage can be built into the mirror data, so that three mirror data may be obtained.

Step 103: sequentially releasing, by the backend development device, the mirror data to the virtual cloud server cluster, wherein mirror data at the last development stage in the mirror data constitute new-version electronic map data, other mirror data in the mirror data except for the mirror data at the last development stage constitute old-version electronic map processing data.

The backend development device may publish the mirror data to the virtual cloud server cluster after building one of the mirror data every time.

Among them, the mirror data corresponding to the pre-release stage is the electronic map data obtained based on the production environment of the practical application. Therefore, the mirror data at the last development stage in all the mirror data, that is, the mirror data obtained during the pre-release stage, constitutes the new-version electronic map data, which can be provided to the user terminal for use.

The mirror data obtained during the preliminary development stage records that which functional developments are performed on the target electronic map, and the mirror data obtained during the testing stage records that which functional testing is performed on the target electronic map. Therefore, in all the mirror data, except for the mirror data at the last development stage, other mirror data, namely the mirror data obtained during the preliminary development stage and the mirror data obtained during the testing stage, constitutes the old-version electronic map processing data.

Since the mirror data obtained during the preliminary development stage and the testing stage may reflect the development process and the testing process of the target electronic map, the old-version electronic map processing data and the new-version electronic map data are kept together in the virtual cloud server cluster, thus allowing for the maintenance of historical electronic map data in the virtual cloud server cluster. The historical electronic map data is crucial for improving electronic map services. By performing statistical analysis on the historical electronic map data, the electronic map services may be optimized, thus improving the user experience.

In addition, the old-version electronic map processing data and the new-version electronic map data are kept together in the virtual cloud server cluster, which makes the rollback of the old version to be realized when there is a problem with the newly published new-version electronic map data, thus avoiding the need for a significant amount of time to re-develop the electronic map and affecting user usage when there is a problem with the new-version electronic map data. Therefore, the embodiment of the present disclosure can reduce development costs and improve user experience by maintaining the old-version electronic map processing data.

Step 104: generating, by the virtual cloud server cluster, identification information corresponding to each of the mirror data, wherein the identification information is used to distinguish different mirror data.

In the embodiment of the present disclosure, for the mirror data at each development stage, corresponding identification information may be generated. So that each of the mirror data is distinguished through unique identification information, the distinction between new-version and old-version electronic map data is achieved, and the distinction of data obtained from different development stages is also achieved.

In the embodiment of the present disclosure, the mirror data at each development stage is distinguished through different identification information, so that when problems subsequently occur in the new-version electronic map, it is easy to identify which development stage caused the problem and fix the mirror data at different development stages.

In the embodiment of the present disclosure, a clustered server architecture may be used. Compared with a single server, the clustered server has strong fault recovery ability and can timely switch related services of a server that have experienced downtime to other servers. In the embodiment of the present disclosure, distributed storage may be performed on the historical electronic map data of each version through different servers in the cluster, and mirror data identification may be performed on the historical electronic map data of each version through unique identification information within the cluster range. Therefore, when a server crashes and needs to migrate the data and related services to other servers, the unique identification information within the cluster range may ensure that the migrated mirror data can be distinguished from the original mirror data in the migrated server.

In the embodiment of the present disclosure, the backend development device first acquires the target electronic map data to be updated, and then sequentially generates the mirror data at different development stages corresponding to the target electronic map data, and sequentially publishes each of the mirror data to the virtual cloud server cluster. Among them, the mirror data at the last development stage in all the mirror data constitute the new-version electronic map data, the other mirror data in all the mirror data constitute the old-version electronic map processing data. And then, the virtual cloud server cluster can generate identification information corresponding to each of the mirror data to distinguish different mirror data. In the embodiment of the present disclosure, while publishing the new-version electronic map data to the virtual cloud server cluster, the old-version electronic map processing data can be kept, and each of the mirror data may be distinguished through the unique identification information, thus achieving maintenance and management of the historical electronic map data and providing a foundation for version rollback.

Figure 3:
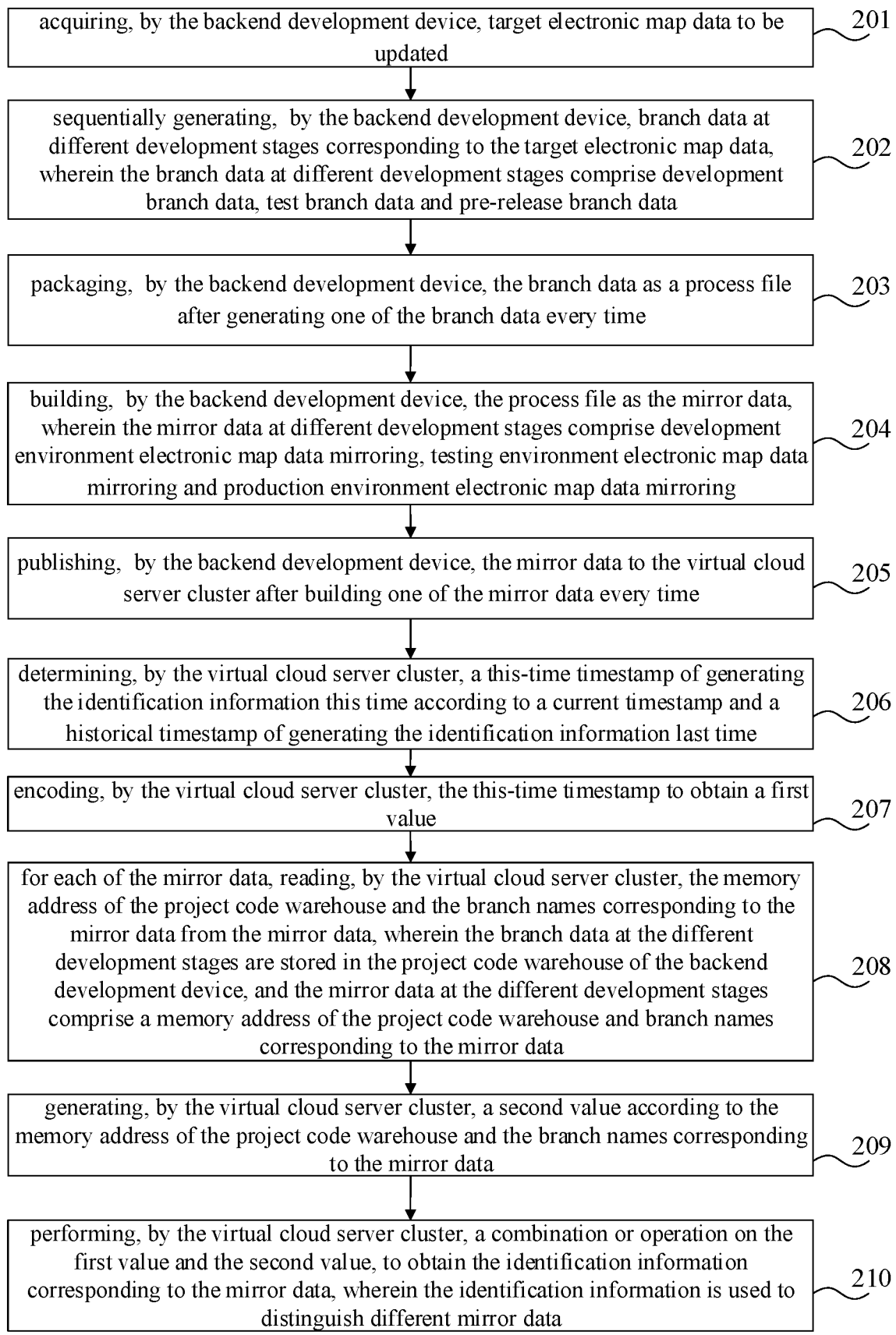
FIG. 3 illustrates a flow chart of steps of another method for operating and maintaining an electronic map according to an embodiment of the present disclosure.

Referring to FIG. 3, which illustrates a flow chart of steps of another method for operating and maintaining an electronic map according to an embodiment of the present disclosure. Before explaining the method, some relevant content may be first introduced.

In some optional embodiments, the virtual cloud server cluster may be a K8S cluster. The K8S cluster is an open source container cluster management system that provides application deployment, maintenance, expansion mechanisms, and other functions. It can be used to manage containerized applications on a plurality of hosts in the cloud platform. The K8S cluster can make containerized deployment of applications simple and efficient.

The process of integrating the applications into the containers and running them is called containerization. In containerized deployment, the application can first be containerized through Docker. Docker is an open source application container engine that allows developers to package their applications and dependency packages into a portable container, which can then be published on computers with Linux, Windows, and other operating systems, as well as on virtualization environments such as the K8S clusters.

Figure 4:
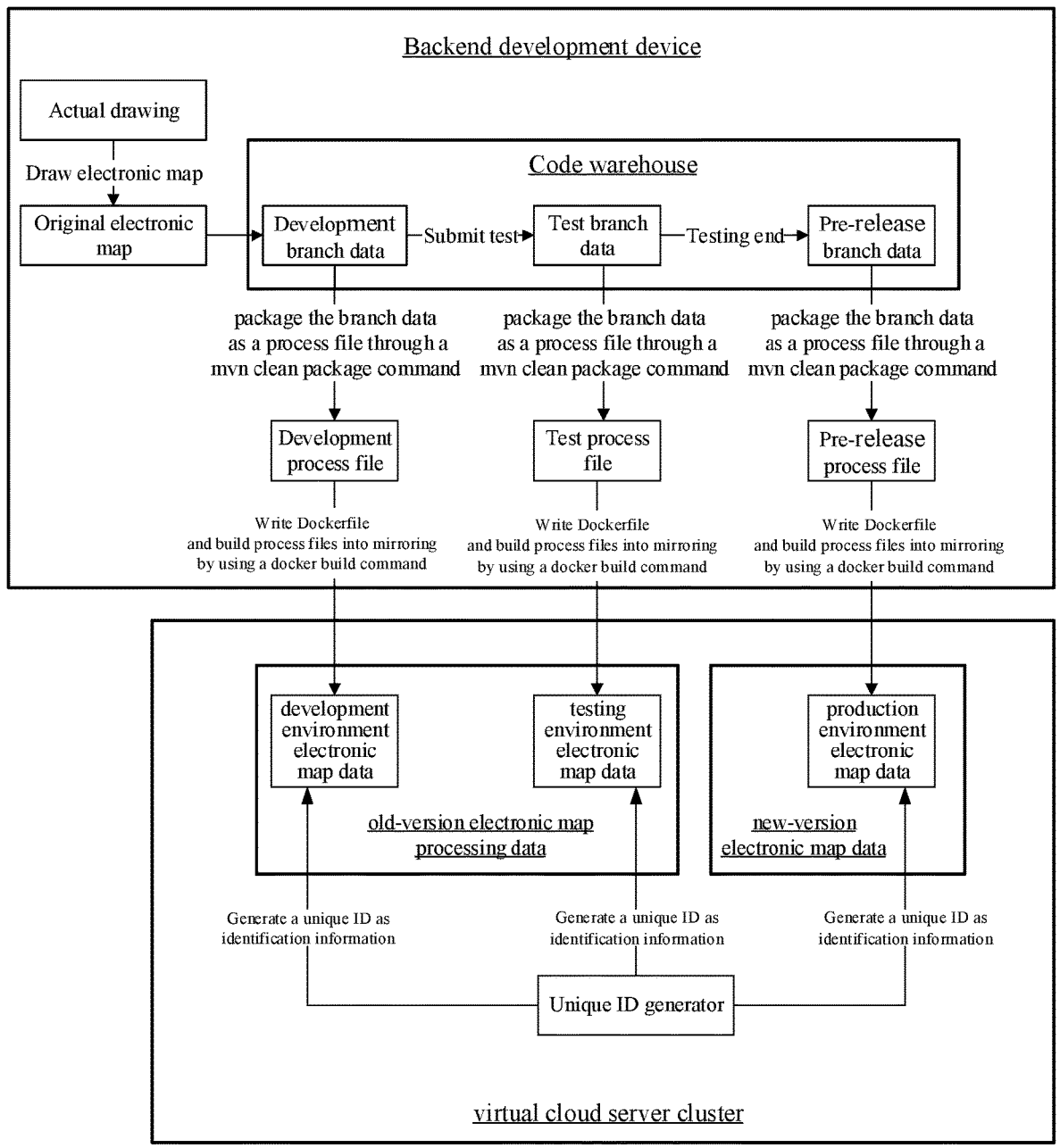
FIG. 4 illustrates a flow chart for operating and maintaining an electronic map according to an embodiment of the present disclosure.

Combined with the specific process for operating and maintaining an electronic map shown in FIG. 4, the method includes the following steps:

step 201: acquiring, by the backend development device, target electronic map data to be updated.

The implementation method of this step can refer to step 101 of the above embodiment.

Step 202: sequentially generating, by the backend development device, branch data at different development stages corresponding to the target electronic map data, wherein the branch data at different development stages include development branch data, test branch data and pre-release branch data.

Referring to FIG. 4, the data obtained during the preliminary development stage is the development branch data, the data obtained during the testing stage is the test branch data, the data obtained during the pre-release stage is the pre-release branch data, and the branch data at different development stages are stored in the project code warehouse of the backend development device. In practical applications, different development projects correspond to different project code warehouses, and different project code warehouses have different memory addresses on the backend.

Step 203: packaging, by the backend development device, the branch data as a process file after generating one of the branch data every time.

Referring to FIG. 4, after the backend development device generates the development branch data, the development branch data may be submitted to the testing branch and packaged as a development process file. After the testing is completed by the backend development device and the test branch data is generated, the test branch data may be submitted to the pre-release branch and packaged as a test process file. After the backend development device generates the pre-release branch data, the pre-release branch data may be packaged as a pre-release process file.

Optionally, referring to FIG. 4, taking maven project (maven is a tool with functions such as project construction, project dependency management, and project information management) as an example, the backend development device can package the branch data as the process file through the mvn clean package command.

Step 204: building, by the backend development device, the process file as the mirror data; wherein the mirror data at different development stages include development environment electronic map data mirroring, testing environment electronic map data mirroring and production environment electronic map data mirroring.

Referring to FIG. 4, the backend development device can build the development process files as the development environment electronic map mirror data (the mirror data, also known as mirroring), build the test process files as the testing environment electronic map mirror data, and build the pre-release process files as the production environment electronic map mirror data.

Taking the implementation of containerization through Docker and the virtual cloud server cluster as the K8S cluster as an example, the creation of the mirror data can be achieved by writing and configuring Dockerfile scripts, and then executing the docker build command. When executing the docker build command, the docker will find the Dockerfile script file and create a docker mirroring based on the instructions in the Dockerfile script file.

The Dockerfile scripts typically include the following four parts: basic mirror information, maintainer information, mirror operation instructions, and instructions executed when the container starts. Among them, the basic mirror can be the basic mirror provided by docker authority, such as nodejs mirror, Java mirror, mongodb mirror, nginx mirror, etc. It can also be the basic image provided by a third party. The maintainer is the maintainer of the process file. The mirror operation instructions include instructions to copy the process file to a certain directory in the container, instructions to specify a directory to be operated on as the directory, instructions to create a mirror, and instructions to expose external ports of the container.

In the embodiment of the present disclosure, the development environment electronic map data mirroring, the testing environment electronic map data mirroring, and the production environment electronic map data mirroring may all be constructed in the above manner. Through containerized deployment, automated mirror construction of the operation and maintenance process of the electronic map is achieved, thus improving the deployment efficiency of the electronic map applications, saving labor costs, and facilitating data management.

Step 205: publishing, by the backend development device, the mirror data to the virtual cloud server cluster after building one of the mirror data every time.

Referring to FIG. 4, after the backend development device builds the development environment electronic map data mirroring, the development environment electronic map data mirroring may be published to the virtual cloud server cluster. After the backend development device builds the testing environment electronic map data mirroring, the testing environment electronic map data mirroring may be published to the virtual cloud server cluster. After the backend development device builds the production environment electronic map data mirroring, the production environment electronic map data mirroring may be published to the virtual cloud server cluster.

Every time the backend development device publishes one of the mirror data to the virtual cloud server cluster, the virtual cloud server cluster may generate unique identification information for the mirror data through subsequent steps to distinguish different mirror data and facilitate data management.

Step 206: determining, by the virtual cloud server cluster, a this-time timestamp of generating the identification information this time according to a current timestamp and a historical timestamp of generating the identification information last time.

In the embodiment of the present disclosure, the virtual cloud server cluster can generate a corresponding unique ID (Identity) for each of the mirror data as identification information through a unique ID generator. In some embodiments, the unique ID generator can generate the unique ID based on a timestamp.

Specifically, in an optional embodiment, step 206 may include the following steps:

S1: determining whether a current first timestamp is less than the historical timestamp of generating the identification information last time.

S2: if the first timestamp is greater than or equal to the historical timestamp, determining a latest second timestamp as the this-time timestamp of generating the identification information this time.

Figure 5:
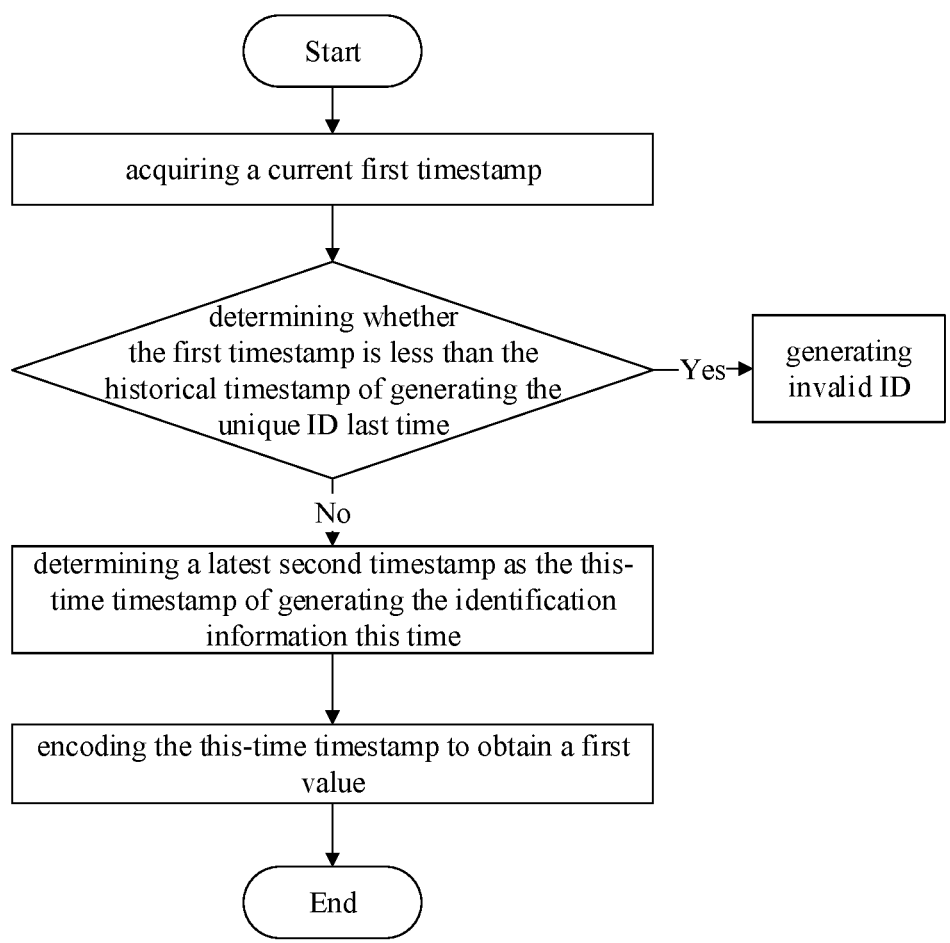
FIG. 5 illustrates a flow chart for generating a first value according to an embodiment of the present disclosure.

FIG. 5 illustrates a flow chart for generating a first value by the unique ID generator. Referring to FIG. 5, the unique ID generator can first obtain the current timestamp, also known as the first timestamp, and then determine whether the current first timestamp is less than the historical timestamp of generating the unique ID last time. If the first timestamp is greater than or equal to the historical timestamp, it indicates that the starting time of generating the unique ID this time is equal to or later than the time of generating the unique ID last time, and the timing is correct. Furthermore, the latest second timestamp may be determined as the this-time timestamp of generating the identification information this time. Among them, the first timestamp is the time when step S1 is executed, the second timestamp is the time when step S2 is executed, and the second timestamp is later than the first timestamp. In practical applications, because the server executes the steps very quickly, the time difference between the second timestamp and the first timestamp is less than a second level.

Furthermore, in practical applications, the unique ID generator generates some temporary cache data during the process of generating the unique ID, such as examples, which occupies some Central Processing Unit (CPU) resources, such as computing resources, storage resources, etc. Therefore, in the embodiment of the present disclosure, optionally, the virtual cloud server cluster can also count the number of continuously generating the unique IDs by the unique ID generator through accumulating the sequence numbers. When the sequence number accumulates to a certain value, temporary cache data is released uniformly, thereby freeing CPU resources. In this way, the space and resources in the virtual cloud server cluster may be effectively utilized.

The virtual cloud server cluster may represent the sequence number through a binary number with a fixed number of bits, thereby limiting the maximum value of the sequence number. For example, the numerical range of a 16 bit sequence number is 0-65535, which means that the sequence number can be accumulated up to 65535. Therefore, temporary cache data may be released uniformly when the sequence number is accumulated to the maximum value.

Specifically, before step 206, the method further includes the following step:

accumulating based on a historical sequence number corresponding to an operation of generating the identification information last time, to obtain a this-time sequence number corresponding to an operation of generating the identification information this time.

Figure 6:
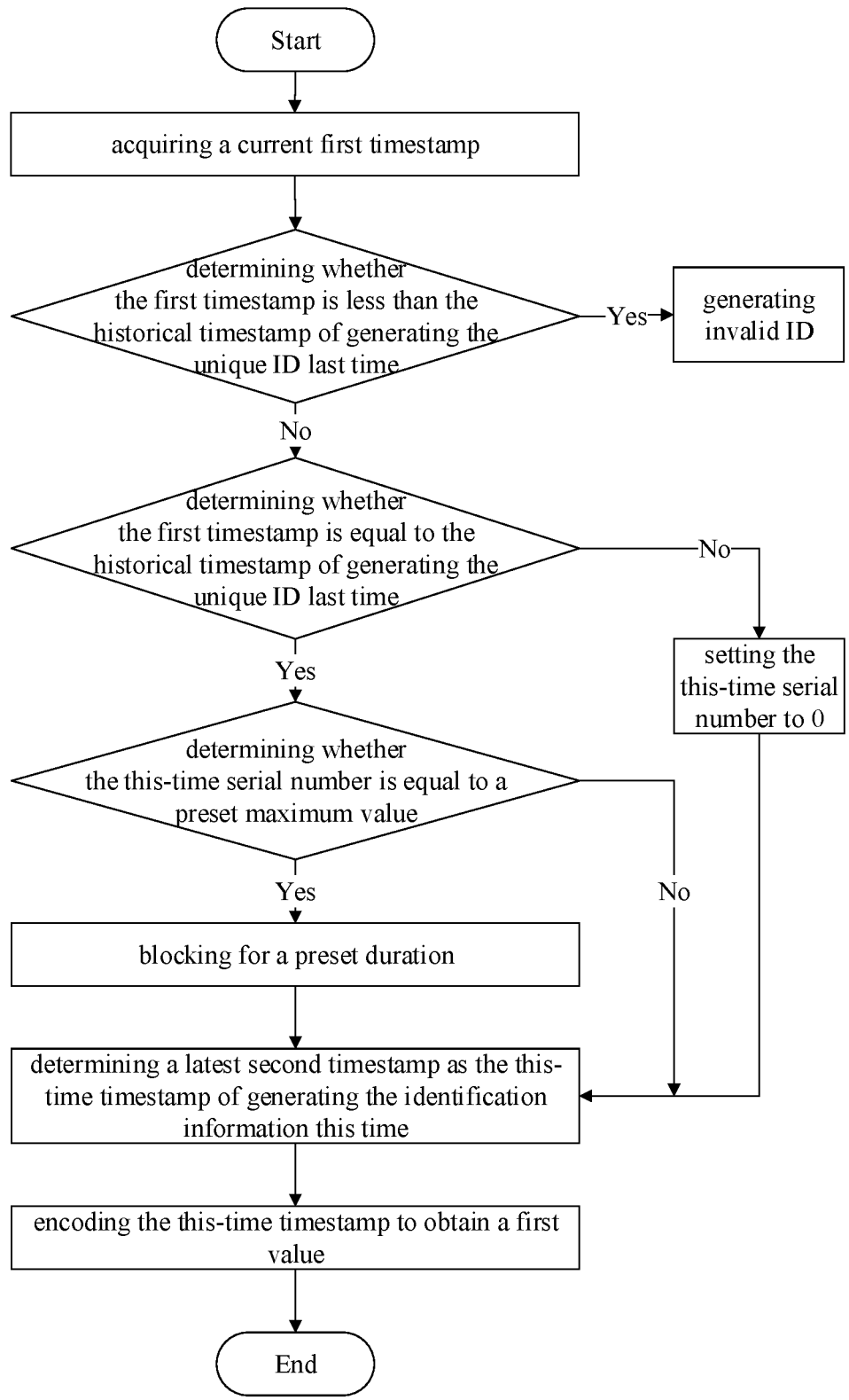
FIG. 6 illustrates another flow chart for generating a first value according to an embodiment of the present disclosure.

Correspondingly, FIG. 6 illustrates another flow chart for generating a first value by the unique ID generator. Referring to FIG. 6, step S2 may specifically include:

S21: if the first timestamp is equal to the historical timestamp, determining whether the this-time sequence number is equal to a preset maximum value;

S22: if the this-time sequence number is equal to the preset maximum value, blocking for a preset duration to release temporary resources, and determining the latest second timestamp as the this-time timestamp of generating the identification information this time; and S23: if the this-time sequence number is less than the preset maximum value, determining the latest second timestamp as the this-time timestamp of generating the identification information this time.

Among them, when a unique ID needs to be generated this time, a preset value such as 1 may be added to the sequence number corresponding to the unique ID generated last time, to obtain the this-time sequence number corresponding to the operation of generating the identification information this time. Furthermore, when the unique ID generator determines that the first timestamp is not less than the historical timestamp, it is necessary to further determine whether the first timestamp is greater than or equal to the historical timestamp. If the first timestamp is equal to the historical timestamp, it indicates that the current generation process is occurred immediately after the generation process last time and is a continuous one with the generation process last time. Therefore, the unique ID generator needs to continue to determine whether this-time sequence number is equal to the preset maximum value, which is the maximum binary number that can be represented by the sequence number digits (such as 65535 in the above example).

The first situation is: if the this-time sequence number is equal to the preset maximum value, the process of generating the unique ID this time will be blocked for the preset duration, which is to pause for the preset duration. During the blocking process, the temporary data may be cleared, the temporary resources may be released, and after the blocking reaches the preset duration, the process will continue, and the latest second timestamp will be determined as the this-time timestamp of generating the unique ID this time.

The second situation is: ff the this-time sequence number is less than the preset maximum value, the latest second timestamp will be directly determined as the this-time timestamp of generating the unique ID this time.

Among them, in the first situation, the this-time sequence number is equal to the preset maximum value, but it does not exceed the preset maximum value. Therefore, the generation process can be successfully completed this time, resulting in the generation of a valid ID.

In addition, in the first situation, due to the blocking of the process of generating the unique ID, the second timestamp in the first situation delays the preset duration compared with the second timestamp in the second situation. In some embodiments, the preset duration may be 1 second.

In addition, step S2 can also include:

S24: if the first timestamp is greater than the historical timestamp, setting the this-time sequence number to 0, and determining the latest second timestamp as the this-time timestamp of generating the identification information this time.

Among them, if the current first timestamp is greater than the historical timestamp of generating the unique ID last time, it indicates that there is a certain time interval between the this-time generation process and the last-time generation process, which are discontinuous generation processes. Therefore, the unique ID generator can set the this-time sequence number to 0, so that when generating the unique ID next time, the sequence number starts to accumulate from 0, and after the this-time sequence number is set to 0, the latest second timestamp is determined as the this-time timestamp of generating the unique ID this time.

The above blocking steps can make the starting time of generating the unique ID next time not equal to the time of generating the unique ID this time, so that the next-time generation process and the this-time generation process are discontinuous. When executing step S1 in the next-time generation process, it will be determined that the first timestamp is greater than the historical timestamp, and then the next-time sequence number will be set to 0 through step S24, which ensures that the next-time sequence number does not exceed the maximum value allowed by the sequence number (i.e., the preset maximum value).

In addition, after step S1, referring to FIG. 5 and FIG. 6, the method further includes the following steps:

S3: if the first timestamp is less than the historical timestamp, generating invalid identification information.

If the current first timestamp is less than the historical timestamp of generating the unique ID last time, it indicates that the start time of generating the unique ID this time is earlier than the time when the unique ID is generated last time, which is incorrect in timing and can lead to generate the invalid ID.

Step 207: encoding, by the virtual cloud server cluster, the this-time timestamp to obtain a first value.

Referring to FIG. 5 and FIG. 6, after the unique ID generator obtains the this-time timestamp, the this-time timestamp may be encoded to obtain the first value. In the embodiment of the present disclosure, the first value is related to the timestamp of generating the unique ID this time, and therefore, they have uniqueness.

Step 208: for each of the mirror data, reading, by the virtual cloud server cluster, the memory address of the project code warehouse and the branch names corresponding to the mirror data from the mirror data, wherein the branch data at the different development stages are stored in the project code warehouse of the backend development device, and the mirror data at the different development stages include the memory address of the project code warehouse and the branch names corresponding to the mirror data.

Figure 7:
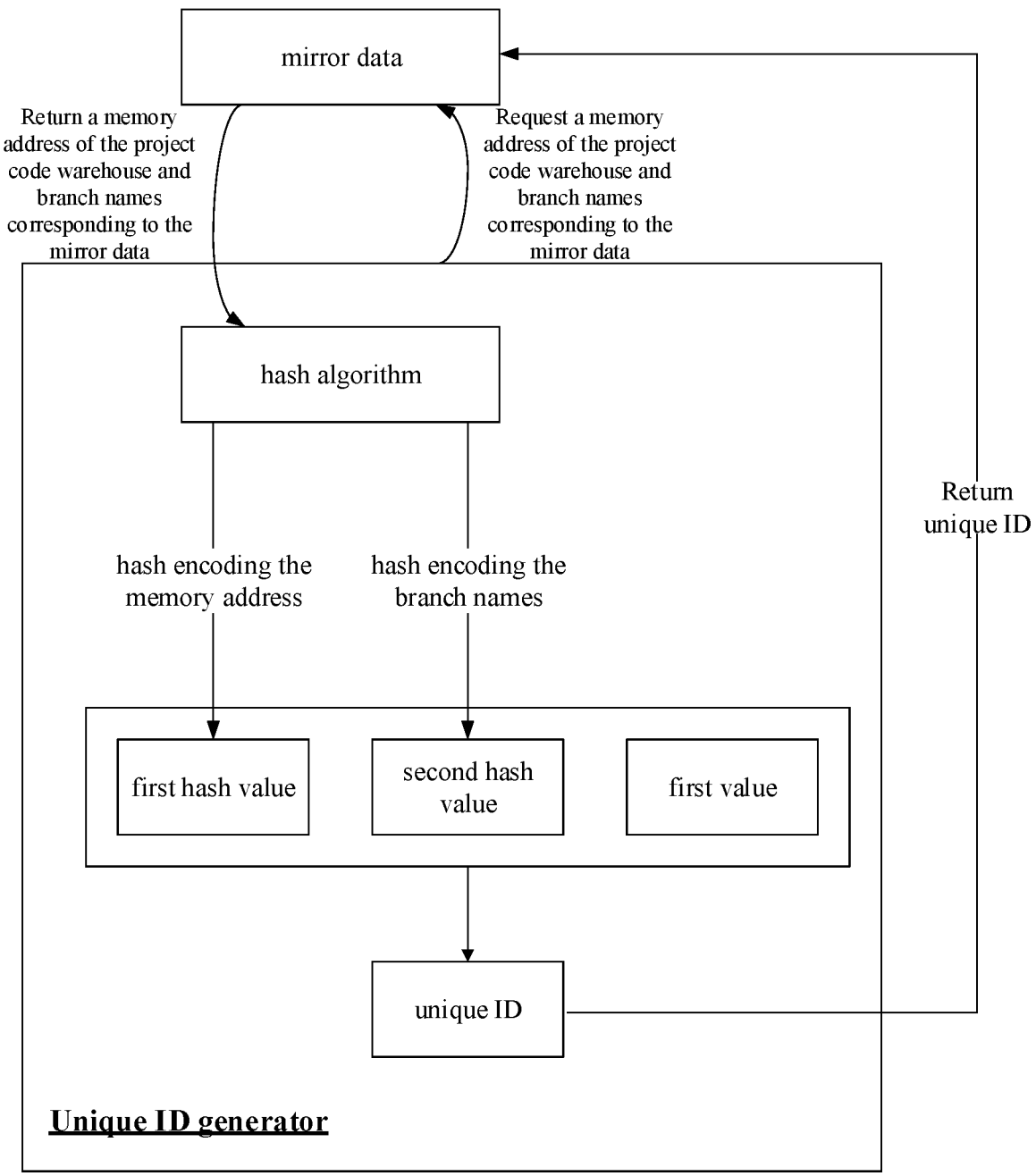
FIG. 7 illustrates a flow chart for generating a unique ID according to an embodiment of the present disclosure.

FIG. 7 illustrates a flow chart for generating a unique ID by the unique ID generator. Referring to FIG. 7, for each of the mirror data, the unique ID generator may read the memory address of the project code warehouse and the branch names corresponding to the mirror data from the mirror data. Among them, code warehouses of different projects (for example, maven project) are different, the memory addresses of the code warehouses are different, and the branch names corresponding to different mirror data in the same project are different.

Step 209: generating, by the virtual cloud server cluster, a second value according to the memory address of the project code warehouse and the branch names corresponding to the mirror data.

The unique ID generator may generate the second value associated with the item to which the mirror data belongs and the corresponding branch according to the memory address of the project code warehouse and the branch names corresponding to the mirror data.

In some embodiments, referring to FIG. 7, step 209 may specifically be achieved by the following steps, including:

hash encoding the memory address of the project code warehouse, to obtain a first hash value;

hash encoding the branch names corresponding to the mirror data, to obtain a second hash value, and obtain a second value including the first hash value and the second hash value.

Among them, the unique ID generator may hash encode the memory address of the project code warehouse and the branch names corresponding to the mirror data, respectively, to obtain the first hash value related to the project and the second hash value related to the branches corresponding to the mirroring, and the second value includes the first hash value and the second hash value.

Step 210: performing, by the virtual cloud server cluster, a combination or operation on the first value and the second value, to obtain the identification information corresponding to the mirror data, wherein the identification information is used to distinguish different mirror data.

When the second value includes the first hash value and the second hash value, step 210 may include:

performing a combination or operation on the first value, the first hash value and the second hash value, to obtain the identification information corresponding to the mirror data.

Among them, the combination method may be to combine the first value, the first hash value, and the second hash value into a numerical value in a preset order of arrangement, and the numerical value is the unique ID of the mirror data. The method of operation may be to perform operations on the first value, the first hash value, and the second hash value according to preset operation methods, such as addition, multiplication, etc., to obtain a calculation result, which is the unique ID of the mirror data.

In the embodiment of the present disclosure, the first value has uniqueness, and the second value is related to the project to which the mirror data belong and corresponding branch of the mirror data. Therefore, the identification information obtained based on the first value and the second value can not only be used to distinguish different mirror data, but also reflect the project to which the mirror data belong and corresponding branch of the mirror data. Therefore, when there is a problem with the mirror data during the operation and maintenance, it may quickly identify the projects and branches caused problems based on the identification information of the mirror data, thus improving the efficiency of the operation and maintenance.

Certainly, in practical applications, further optionally, the unique ID may also be generated by using Universal Unique Identifier (UUID) generators. Redis atomicity self-increasing, snowflake algorithms, and other methods, which are not limited in the embodiment of the present disclosure.

In practical applications, after a set of the development environment electronic map data mirroring, the testing environment electronic map data mirroring, and the production environment electronic map data mirroring is published, when the actual site corresponding to the drawing has changes such as area deletion (for example, a building being planned outside the park), area merging for example, adding an area to merge into a parking lot to expand parking spaces), etc., the electronic map may be first modified in the backend development device to remove the areas that need to be deleted from the electronic map, or draw the areas that need to be merged in the electronic map to obtain the updated electronic map, and then the new development branch data is obtained after other developments. Then, through testing and other steps, new test branch data and new pre-release branch data are obtained. Then, through steps 203-210, a new set of the development environment electronic map data mirroring, the testing environment electronic map data mirroring, and the production environment electronic map data mirroring are obtained, thereby achieving the region deletion and the region merging of the electronic maps.

Every time there is a change in the actual site, three of the mirror data can be obtained based on the changed actual site, and three of the mirror data per publication can be saved in the virtual cloud server cluster and distinguished by unique identification information within the cluster range.

In addition, in some embodiments, after step 210, the method may further include the following step:

configuring a corresponding data processing interface for each of the mirror data, wherein the data processing interface is used to add data, delete data, modify data, and search for data on the mirror data corresponding to the data processing interface.

Among them, the mirror data is stored in a specific device of the virtual cloud server cluster. When statistics, analysis, and other operations need to be performed based on the mirror data, the relevant data in the mirror data needs to be read from the corresponding device. Therefore, the virtual cloud server cluster can configure the corresponding data processing interface for each mirror data and open the data processing interface to other devices. Thus, other devices can add, modify, delete, and check the related data through the data processing interface.

In the embodiment of the present disclosure, throughout the entire operation and maintenance process, each data or processing process can be visualized to facilitate more efficient development and maintenance on the electronic maps by the developers.

In the embodiment of the present disclosure, the backend development device first acquires the target electronic map data to be updated, and then sequentially generates the mirror data at different development stages corresponding to the target electronic map data, and sequentially publishes each of the mirror data to the virtual cloud server cluster. Among them, in the mirror data, the mirror data at the last development stage constitute the new-version electronic map data, the other mirror data in the mirror data constitute the old-version electronic map processing data, and then the virtual cloud server cluster can generate the identification information corresponding to each of the mirror data to distinguish different mirror data. In the embodiment of the present disclosure, while publishing the new-version electronic map data to the virtual cloud server cluster, the old-version electronic map processing data can be kept, and the mirror data is distinguished through unique identification information, thus achieving maintenance and management of the historical electronic map data and providing a foundation for version rollback.

Figure 8:
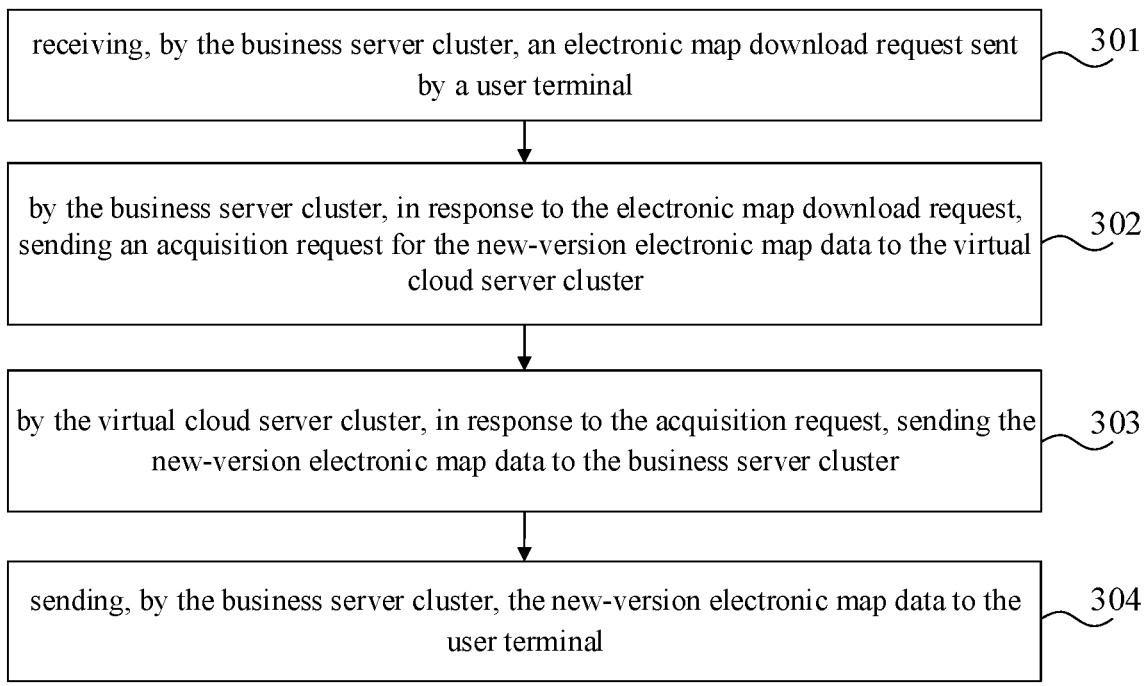
FIG. 8 illustrates a flow chart of steps of a method for using electronic map data according to an embodiment of the present disclosure.
Figure 9:
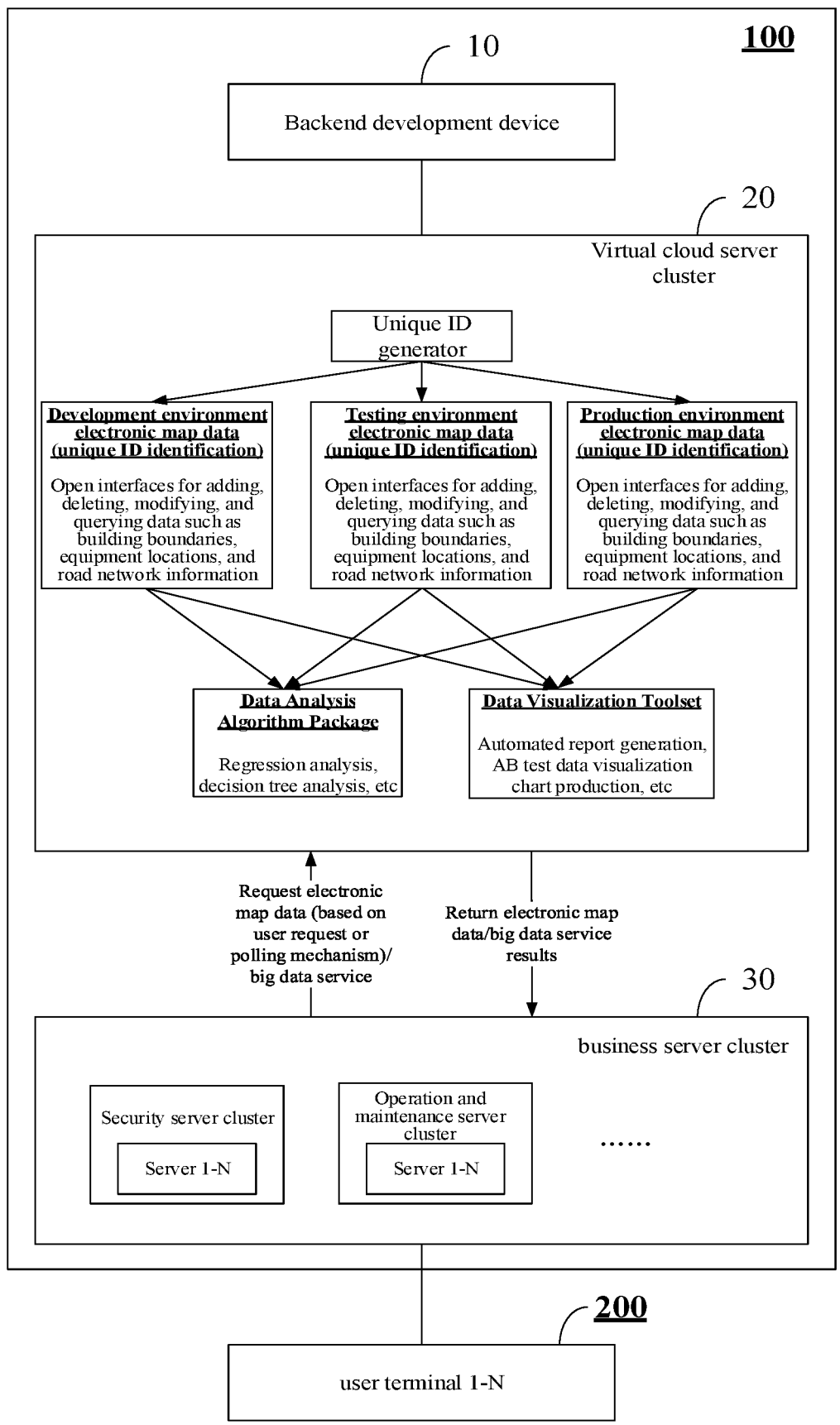
FIG. 9 illustrates a block diagram of another electronic map service system according to an embodiment of the present disclosure.

Referring to FIG. 8, which illustrates a flow chart of steps of a method for using electronic map data according to an embodiment of the present disclosure. The method is applied to the electronic map service system 100 of the method for operating and maintaining an electronic map as described above. Referring to FIG. 9, the electronic map service system 100 further includes a business server cluster 30, the virtual cloud server cluster 20 and the business server cluster 30 are connected in communication, and the user terminal 200 and the business server cluster 30 are connected in communication.

In some embodiments, the business server cluster 30 may provide further services on the basis of the mirror data (electronic map data) provided by the virtual cloud server cluster 20, such as security services, operation and maintenance services for the areas indicated on the map.

The method may be used to use the mirror data obtained through the method for operating and maintaining the electronic map as described above, which includes the following steps:

step 301: receiving, by the business server cluster, an electronic map download request sent by a user terminal.

When a user needs to view an electronic map, the user terminal may send the electronic map download request to the business server cluster through the electronic map client to request to acquire the latest version of the electronic map data.

Step 302: by the business server cluster, in response to the electronic map download request, sending an acquisition request for the new-version electronic map data to the virtual cloud server cluster.

The business server cluster receives the electronic map download request and responds, then sends the acquisition request for the new-version electronic map data to the virtual cloud server cluster.

Step 303: by the virtual cloud server cluster, in response to the acquisition request, sending the new-version electronic map data to the business server cluster.

The business server cluster receives the acquisition request and responds, then returns the new-version electronic map data, that is, the production environment electronic map mirror data, to the business server cluster.

Step 304: sending, by the business server cluster, the new-version electronic map data to the user terminal.

After the business server cluster receives the new-version electronic map data, the new-version electronic map data may be returned to the user terminal which requests the electronic map data. In the embodiment of the present disclosure, the map data services may be provided by the virtual cloud server cluster, while the business services may be provided by the business server cluster. The business services and the map data services are stored in different server cluster, respectively, to achieve decoupling between the two. The server decoupling means distinguishing the computing, memory, and other resources of the server, in order to allocate the server resources according to the specific needs of each workload, thus improving the efficiency of providing services.

Figure 10:
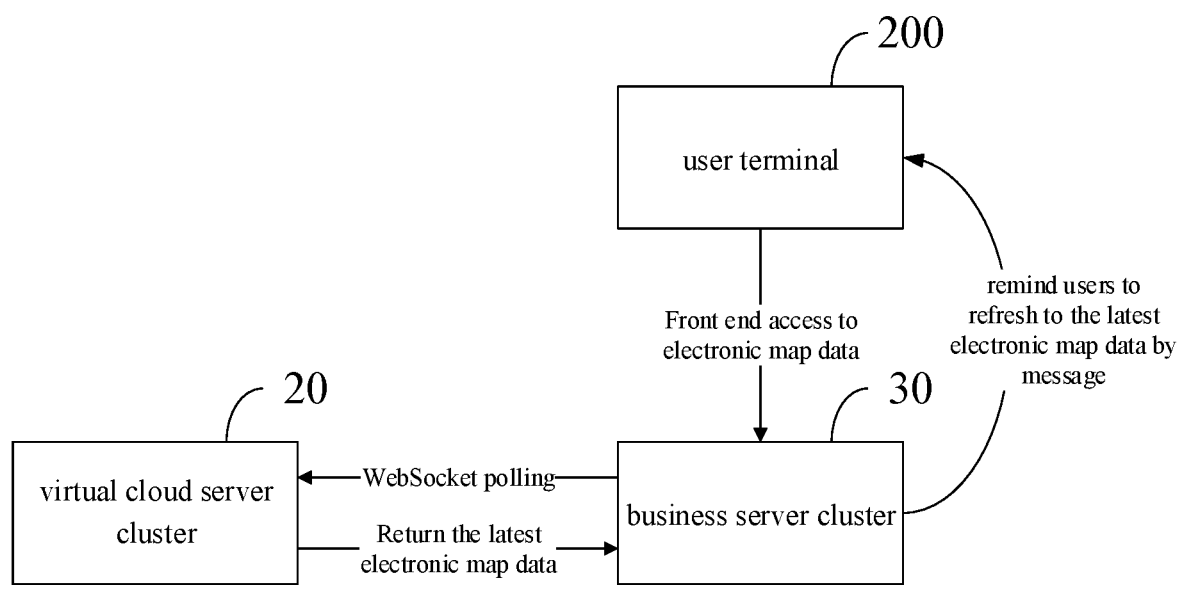
FIG. 10 illustrates a flow chart for updating electronic map data in a user terminal according to an embodiment of the present disclosure.

Optionally, referring to FIG. 10, the method may further include the following steps:
  detecting, by business server cluster, whether the virtual cloud server cluster has updates of the electronic map data by polling the virtual cloud server cluster;
  by the virtual cloud server cluster, when new new-version electronic map data is obtained by updating, sending the new new-version electronic map data to the business server cluster; and
  by the business server cluster, when the new new-version electronic map data is received, sending prompt information to the user terminal, wherein the prompt information is used to prompt a terminal user to download the new new-version electronic map data, to update to the latest electronic map.

In the embodiment of the present disclosure, the business server cluster may actively monitor whether the virtual cloud server cluster has updates of the electronic map data through a polling mechanism. If there are updates, based on the polling mechanism, the virtual cloud server cluster can immediately return the updated electronic map data to the business server cluster after the update is completed.

Optionally, in the case that the business server is a Web server, communication between the business server cluster and the virtual cloud server cluster may be achieved through a WebSocket (network socket) connection. Correspondingly, the polling method may use WebSocket polling.

Prior to this, it is necessary to establish a communication connection between the business server cluster and the virtual cloud server cluster that could implement a polling mechanism. Taking the WebSocket connection as an example, the business server cluster first initiates a request to upgrade to the WebSocket communication protocol. After receiving the request, the virtual cloud server cluster can return a response protocol upgrade message to the business server cluster to establish the WebSocket connection between the two, and then the business server cluster can poll.

When the business server cluster polls, it can first initiate an inquiry with the virtual cloud server cluster to inquire whether the virtual cloud server cluster has updates of the electronic map data. If there are no updates, the virtual cloud server cluster will not respond. If there are updates, the virtual cloud server cluster can return the latest electronic map data to the business server cluster. In the business server cluster, it is necessary to set the duration of waiting for the virtual cloud server cluster to respond after the inquiry, as well as the time interval between the end of this-time inquiry and the start of the next-time inquiry. If the virtual cloud server cluster does not respond within this duration, it is considered that there is no update. This-time inquiry ends, and then the next-time inquiry will be conducted after the time interval.

Certainly, in practical applications, if the user side actively requests the download of the new-version electronic map data (i.e., step 301), the business server cluster may pause polling first, and then immediately request the latest electronic map data from the virtual cloud server cluster through steps 302-304 to provide feedback to the user side. After the business server cluster requests, it can wait for a period of time (usually very short, such as a few seconds). If the latest electronic map data is not obtained from the virtual cloud server cluster after a period of time, it indicates that the electronic map data obtained by the business server cluster through previous polling is already the latest electronic map data, furthermore, the business server cluster can directly return the latest electronic map locally to the user side.

Compared with the solution where the business server cluster obtains the latest electronic map data from the virtual cloud server cluster only when requested by the user side, the embodiment of the present disclosure may make the business server cluster to obtain the latest electronic map data from the virtual cloud server cluster in the first time by adding the polling mechanism from the business server cluster to the virtual cloud server cluster, and when the user side initiates a request, the business server cluster can quickly respond to the requests of the user side and quickly send the latest electronic map data to the user side, thus shortening the time it takes for the user to obtain the latest electronic map data and improving the user experience.

In addition, the embodiment of the present disclosure may also configure a determination repetition mechanism of the latest electronic map data in the business server cluster, to cope with situations where the virtual cloud server cluster may repeatedly send the electronic map data. Specifically, in practical applications, the virtual cloud server cluster may mistakenly assume that there is an update without updating the electronic map data due to an error, and then send the previously sent electronic map data to the business server cluster. A cache may be set in the business server cluster to store the electronic map data obtained from the virtual cloud server cluster each time. Every time the business server cluster receives one of the electronic map data from the virtual cloud server cluster, it can compare the unique identification information of the electronic map data with the unique identification information of other electronic map data in the cache. If there are electronic map data with the same unique identification information in the cache, it indicates that the business server cluster has received the electronic map data before. Therefore, the business server cluster can delete the electronic map data received this time, and there is no need to perform related operations on the electronic map data, thus saving the resources of the business server cluster.

After obtaining the latest electronic map data, the business server cluster can immediately prompt the user to update the electronic map through a message push mechanism.

In the embodiment of the present disclosure, through a polling mechanism, the business server cluster can obtain the latest electronic map data in the first time, which facilitates the user terminal to update the electronic map timely and avoids navigation errors and other issues caused by users using the old-version electronic maps. In addition, through the message push mechanism, the business server cluster can prompt the users to update the electronic map, rather than directly sending it to the user terminal for updates, which can avoid affecting users who are using the old-version electronic map.

Certainly, in practical applications, it can also be that the user terminal first determines whether there is an update of the electronic map data in the virtual cloud server cluster through the business server cluster when it needs to use the electronic map every time. If there is an update, the current latest-version electronic map data will be returned to the user terminal. If there is no update, the user terminal will be notified, and the user terminal will use the current locally stored electronic map data.

In some embodiments, the terminal users can download the electronic map data to the local terminal and then use it offline. In this case, the business server cluster can update the local electronic map data through a polling mechanism without affecting users who use the electronic map offline.

In other embodiments, the terminal users can use the electronic map data in the business server cluster online when the terminal and the business server cluster are connected in communication, without the need to download the electronic map data to the local terminal.

In this case, optionally, the virtual cloud server cluster can be set to publish the electronic map data on a scheduled basis during periods when there are no or fewer users online, so that the business server cluster can update the local electronic map data at that time to avoid large-scale impact on the usage of online users.

In this case, alternatively, the business server cluster can perform grayscale updates on the electronic map data for all terminal users. When the business server cluster obtains the latest electronic map data from the virtual cloud server cluster, there are still some users using the old-version electronic map data online. Therefore, the business server cluster can retain both the latest-version electronic map data and the old-version electronic map data, and provide the latest electronic map data for users who will connect to the business server cluster in the future, but continue to provide the old-version electronic map for users who are currently online. When the users who use the old-version electronic map data go offline and then connect to the business server cluster again, the business server cluster also provides the latest electronic map data to the users, until all users who use the old-version electronic map go offline, the business server cluster can delete the old-version electronic map data and completely switch to the new-version electronic map to provide map services. In this solution, it can be ensured that the usage of the this-time electronic map data of online users is not affected, and the latest electronic map data can be used at the next launch.

Figure 11:
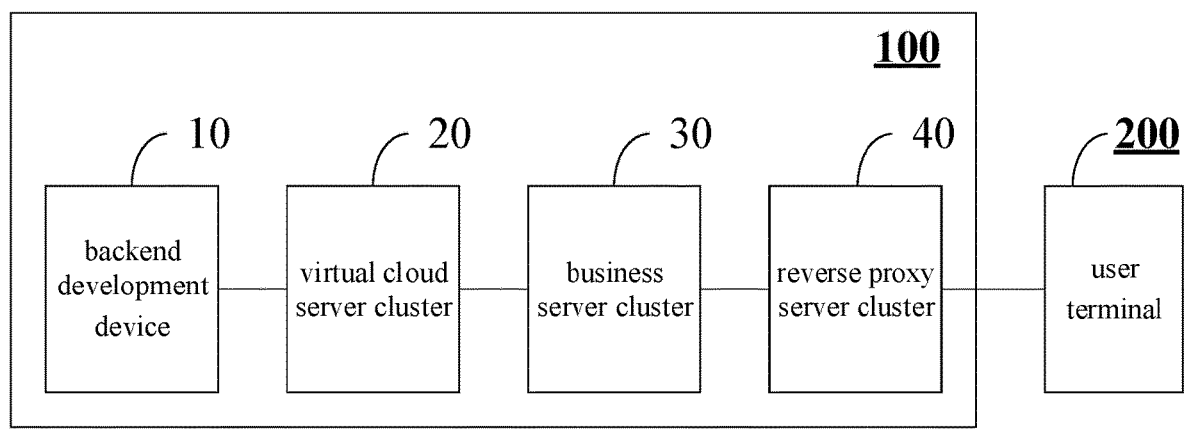
FIG. 11 illustrates a block diagram of yet another electronic map service system according to an embodiment of the present disclosure.

Referring to FIG. 11, the electronic map service system 100 further includes a reverse proxy server cluster 40, and the business server cluster 30 and the user terminal 200 are connected in communication by the reverse proxy server cluster 40. Among them, the backend development device 10, the virtual cloud server cluster 20, the business server cluster 30, and reverse proxy server cluster 40 belong to the backend, while the user terminal 200 belongs to the front end.

Correspondingly, step 301 may include the following steps: receiving, by the reverse proxy server cluster, the electronic map download request sent by the user terminal; scheduling, by the reverse proxy server cluster, the electronic map download request to the target business server of the business server cluster according to a preset scheduling mechanism; and receiving, by the target business server, the electronic map download request.

Step 302 may include the following steps: by the target business server, in response to the electronic map download request, sending the acquisition request for the new-version electronic map data to the virtual cloud server cluster.

Step 304 may include the following steps: sending, by the target business server, the new-version electronic map data to the reverse proxy server cluster; and sending, by the reverse proxy server cluster, the new-version electronic map data to the user terminal.

Among them, the electronic map download request of the user terminal is first sent to the reverse proxy server cluster, which can provide reverse proxy services based on the scheduling mechanism to schedule the electronic map download request to the target business server in the business server cluster, and then the target business server processes the request of the user terminal. Through the reverse proxy mechanism, user requests can be scheduled to the business server that accepts the request, while hiding the actual business server that provides the service from the user. Users do not need to know the address of the business server that actually provides the service, nor do they need to configure it on the front end of the user. In some embodiments, the business server may be a Web (website) server, and the reverse proxy server may be used for web acceleration, that is, using the reverse proxy server as the front-end machine of the Web server to reduce network and server load and improve access efficiency.

Optionally, the method may also include the following steps:
- sending, by the business server cluster, a big data service request to the virtual cloud server cluster;
- by the virtual cloud server cluster, in response to the big data service request, acquiring required relevant data from at least one of the mirror data;
- performing, by the virtual cloud server cluster, data processing on the relevant data according to the big data service request, to obtain a processing result; and
- sending, by the virtual cloud server cluster, the processing result to the business server cluster.

In the embodiment of the present disclosure, the virtual cloud server cluster can not only provide map data services, but also provide big data services, such as calculation, statistics, analysis, visualization processing, and other services of the big data. Among them, the virtual cloud server cluster can deploy data analysis algorithm packages to provide big data services such as regression analysis and decision tree analysis. The virtual cloud server cluster can also deploy data visualization toolsets to provide big data services such as automated report generation and AB test data visualization chart production.

When the business server cluster needs it, it can send a big data service request to the virtual cloud server cluster. After receiving the request, the virtual cloud server cluster responds and obtains the relevant data required for this big data service from at least one of the mirror data. Among them, what data is obtained is related to the requested service. The virtual cloud server cluster can then perform data processing on the relevant data according to the requested big data service to obtain processing results. The type of processing is related to the requested service.

The above step of in response to the big data service request, acquiring required relevant data from at least one of the mirror data may specifically include:

in response to the big data service request, acquiring required relevant data from at least one of the mirror data according to addresses and ports of the mirror data in a local area network to which the virtual cloud server cluster belongs.

In practical applications, data analysis algorithm packages or data visualization toolsets can be stored on different physical servers in the virtual cloud server cluster with various mirror data. Therefore, referring to FIG. 12, before providing the big data services, the physical server where the data analysis algorithm package or the data visualization toolsets (FIG. 12 takes the data analysis algorithm package as an example) is located needs to first establish a connection with the physical server where the required mirror data is located by the corresponding local area network addresses and ports, and then grab the relevant data in the mirror data through the local area network addresses and ports.

Figure 12:
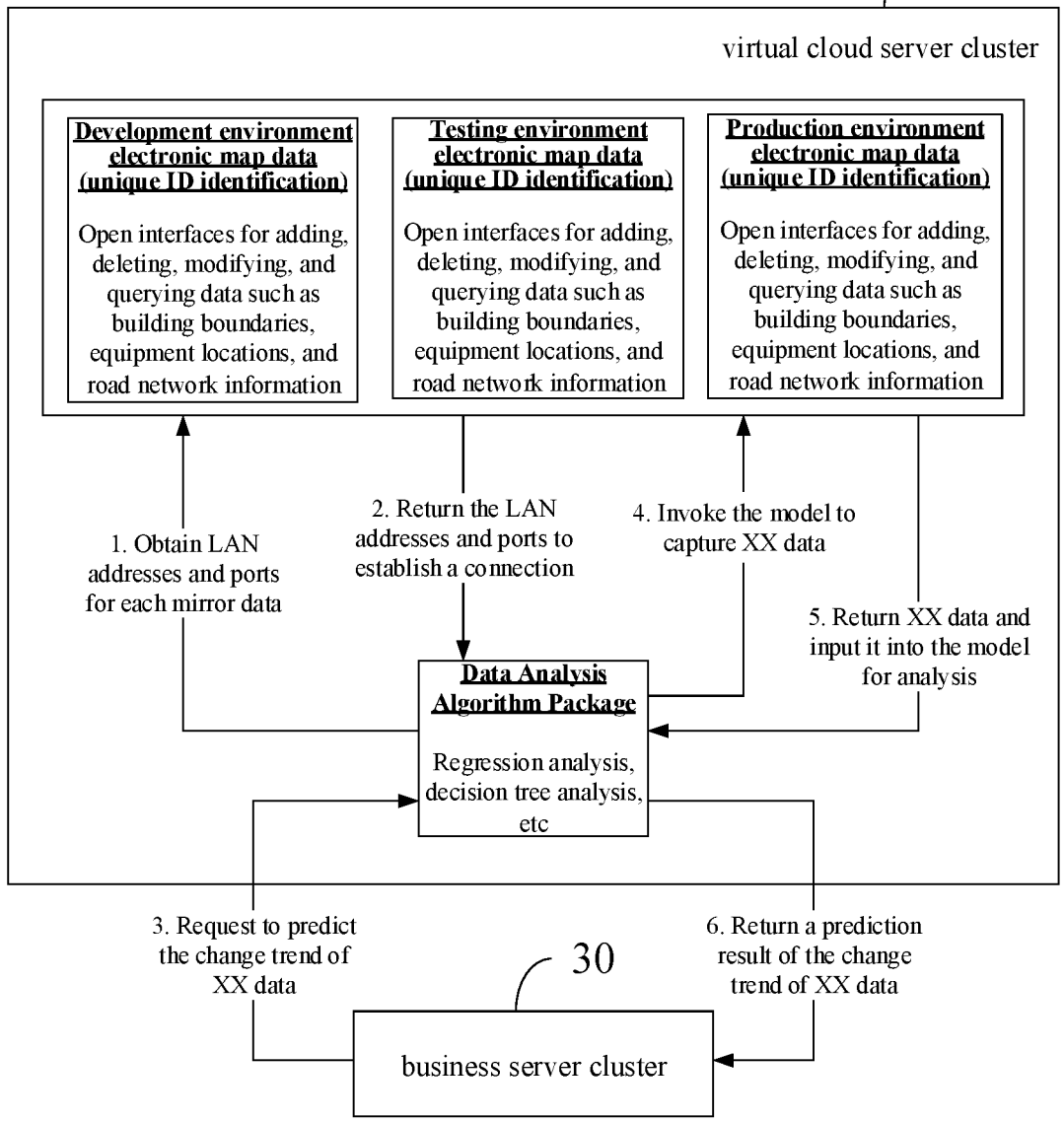
FIG. 12 illustrates a flow chart for providing a big data service according to an embodiment of the present disclosure.

Afterwards, referring to FIG. 12, the data analysis algorithm packages or the data visualization toolsets may be used to perform data process on the grabbed relevant data through models or tools.

Optionally, the above steps of performing data processing on the relevant data may include:

performing data analysis on the relevant data through a data analysis model;
and/or,
generating a visualization chart according to the relevant data.

Among them, referring to FIG. 12, the virtual cloud server cluster may return big data service processing results such as data analysis results and visualization charts to the business server cluster, which may further provide other services based on the data analysis results or the visualization charts.

In the embodiment of the present disclosure, the map data service and big data service are performed uniformly in the virtual cloud server cluster, thus achieving the invocation of computing services and map data in a unified local area network, improving the operational efficiency of the big data algorithms. The business services and map data services are stored in different server clusters to achieve decoupling between the two, which enables the business server to focus on handling relevant business services (such as security services) in the areas indicated by the electronic map (such as the park), without consuming more computing, network calls, storage or other resources for storing and maintaining the map data.

In the embodiment of the present disclosure, the business server cluster responds when receiving the electronic map download request sent by the user terminal, and sends an acquisition request of the new-version electronic map data to the virtual cloud server cluster. The virtual cloud server cluster responds to the acquisition request and returns the new-version electronic map data to the business server cluster. The business server cluster then returns the new-version electronic map data to the user terminal to provide related services of the electronic map to the user terminal, thereby achieving the acquisition and use of the electronic map data.

The embodiment of the present disclosure further provides an electronic map service system, referring to FIG. 2, FIG. 9 and FIG. 11, including a backend development device and a virtual cloud server cluster, and the backend development device is connected to the virtual cloud server cluster in communication:

the backend development device is configured for acquiring target electronic map data to be updated; sequentially generating mirror data at different development stages corresponding to the target electronic map data; and sequentially publishing the mirror data to the virtual cloud server cluster, wherein mirror data at the last development stage in the mirror data constitute new-version electronic map data, other mirror data in the mirror data except for the mirror data at the last development stage constitute old-version electronic map processing data;

the virtual cloud server cluster is configured for generating identification information corresponding to each of the mirror data, wherein the identification information is used to distinguish different mirror data.

Optionally, referring to FIG. 9, the electronic map service system further includes a business server cluster, and the virtual cloud server cluster and the business server cluster are connected in communication;

the business server cluster is configured for sending a computing service request to the virtual cloud server cluster;

the virtual cloud server cluster is further configured for, in response to the computing service request, acquiring relevant data required for computation from at least one of the mirror data; performing data analysis and processing on the relevant data according to the computing service request, to obtain an analysis result; and sending the analysis result to the business server cluster.

Optionally, referring to FIG. 11, the electronic map service system further includes a reverse proxy server cluster, the business server cluster includes a plurality of business servers, and the reverse proxy server cluster and each of the plurality of business servers are connected in communication; and the reverse proxy server cluster is configured for scheduling a request sent by a user terminal to one of the plurality of business servers of the business server cluster according to a preset scheduling mechanism.

The term "one embodiment", "embodiments", or "one or more embodiments" referred to in the specification means that the specific features, structures, or characteristics described in conjunction with the embodiments are included in at least one embodiment of the present disclosure. Furthermore, please note that the example of the term "in one embodiment" may not necessarily refer to the same embodiment.

The specification provided here provides a large number of specific details. However, it can be understood that the embodiments of the present disclosure can be practiced without these specific details. In some examples, well-known methods, structures, and techniques are not shown in detail to avoid blurring the understanding of the specification.

In the claims, any reference symbol between parentheses should not be construed as a restriction on the claims. The word "comprising" does not exclude the presence of components or steps not listed in the claims. The words "a/an" or "one" before a component do not exclude the existence of multiple such components. The present disclosure can be achieved through hardware comprising several different components and through appropriately programmed computers. Among the unit claims that list several devices, several of these devices can be specifically embodied through the same hardware item. The use of words first, second, and third does not indicate any order. These words can be interpreted as names.

Finally, it should be noted that the above embodiments are only used to illustrate the disclosed technical solution, not to limit it. Although the present disclosure has been described in detail with reference to the aforementioned embodiments, ordinary technical personnel in the art should understand that they can still modify the technical solutions recorded in the aforementioned embodiments or equivalently replace some of the technical features. And these modifications or replacements do not separate the essence of the corresponding technical solutions from the spirit and scope of the embodiments of the present disclosure.

The invention claimed is:

1. A method for operating and maintaining an electronic map, applied to an electronic map service system, wherein the electronic map service system comprises a backend development device and a virtual cloud server cluster, the backend development device is a terminal used by an electronic map developer for backend development of the electronic map, the backend development device and the virtual cloud server cluster are connected in communication, and the method comprises:
   acquiring, by the backend development device, target electronic map data to be updated;
   sequentially generating, by the backend development device, mirror data at different development stages corresponding to the target electronic map data;
   sequentially publishing, by the backend development device, the mirror data to the virtual cloud server cluster, wherein mirror data at the last development stage in the mirror data constitute new-version electronic map data, other mirror data in the mirror data except for the mirror data at the last development stage constitute old-version electronic map processing data; and
   generating, by the virtual cloud server cluster, identification information corresponding to each of the mirror data, wherein the identification information is used to distinguish different mirror data.

2. The method according to claim 1, wherein the sequentially generating mirror data at different development stages corresponding to the target electronic map data comprises:
   sequentially generating branch data at different development stages corresponding to the target electronic map data;
   packaging the branch data as a process file after generating one of the branch data every time; and
   building the process file as the mirror data;
   wherein the branch data at different development stages comprise development branch data, test branch data and pre-release branch data, and the mirror data at different development stages comprise development environment electronic map data mirroring, testing environment electronic map data mirroring and production environment electronic map data mirroring.

3. The method according to claim 2, wherein the sequentially publishing the mirror data to the virtual cloud server cluster comprises:
   publishing the mirror data to the virtual cloud server cluster after building one of the mirror data every time.

4. The method according to claim 2, wherein the branch data at the different development stages are stored in a project code warehouse of the backend development device, and the mirror data at the different development stages comprise a memory address of the project code warehouse and branch names corresponding to the mirror data;
   the generating identification information corresponding to each of the mirror data comprises:
   determining a this-time timestamp of generating the identification information this time according to a current timestamp and a historical timestamp of generating the identification information last time;
   encoding the this-time timestamp to obtain a first value;
   for each of the mirror data, reading the memory address of the project code warehouse and the branch names corresponding to the mirror data from the mirror data;
   generating a second value according to the memory address of the project code warehouse and the branch names corresponding to the mirror data; and
   performing a combination or operation on the first value and the second value, to obtain the identification information corresponding to the mirror data.

5. The method according to claim 4, wherein the determining a this-time timestamp of generating the identification information this time according to a current timestamp and a historical timestamp of generating the identification information last time comprises:
   determining whether a current first timestamp is less than the historical timestamp of generating the identification information last time; and
   when the first timestamp is greater than or equal to the historical timestamp, determining a latest second timestamp as the this-time timestamp of generating the identification information this time.

6. The method according to claim 5, wherein before the determining a this-time timestamp of generating the identification information this time according to a current timestamp and a historical timestamp of generating the identification information last time, the method further comprises:
   accumulating based on a historical sequence number corresponding to an operation of generating the identification information last time, to obtain a this-time sequence number corresponding to an operation of generating the identification information this time;
   when the first timestamp is greater than or equal to the historical timestamp, determining a latest second timestamp as the this-time timestamp of generating the identification information this time, comprises:
   when the first timestamp is equal to the historical timestamp, determining whether the this-time sequence number is equal to a preset maximum value;
   when the this-time sequence number is equal to the preset maximum value, blocking for a preset duration to release temporary resources, and determining the latest second timestamp as the this-time timestamp of generating the identification information this time; and
   when the this-time sequence number is less than the preset maximum value, determining the latest second timestamp as the this-time timestamp of generating the identification information this time.

7. The method according to claim 6, wherein when the first timestamp is greater than or equal to the historical timestamp, determining a latest second timestamp as the this-time timestamp of generating the identification information this time, comprises:
   when the first timestamp is greater than the historical timestamp, setting the this-time sequence number to 0, and determining the latest second timestamp as the this-time timestamp of generating the identification information this time.

8. The method according to claim 5, wherein after determining whether a current first timestamp is less than the historical timestamp of generating the identification information last time, the method further comprises:
when the first timestamp is less than the historical timestamp, generating invalid identification information.

9. The method according to claim 4, wherein generating a second value according to the memory address of the project code warehouse and the branch names corresponding to the mirror data comprises:
hash encoding the memory address of the project code warehouse, to obtain a first hash value;
hash encoding the branch names corresponding to the mirror data, to obtain a second hash value, and obtain a second value comprising the first hash value and the second hash value;
the performing a combination or operation on the first value and the second value, to obtain the identification information corresponding to the mirror data comprises:
performing a combination or operation on the first value, the first hash value and the second hash value, to obtain the identification information corresponding to the mirror data.

10. The method according to claim 1, wherein after generating identification information corresponding to each of the mirror data, the method further comprises:
configuring a corresponding data processing interface for each of the mirror data, wherein the data processing interface is used to add data, delete data, modify data, and search for data on the mirror data corresponding to the data processing interface.

11. A method for using electronic map data, applied to the electronic map service system of the method for operating and maintaining the electronic map according to claim 1, wherein the electronic map service system further comprises a business server cluster, the virtual cloud server cluster and the business server cluster are connected in communication, the method is configured to use the mirror data obtained by the method for operating and maintaining the electronic map according to claim 1, and the method comprises:
receiving, by the business server cluster, an electronic map download request sent by a user terminal;
sending an acquisition request for the new-version electronic map data to the virtual cloud server cluster by the business server cluster in response to the electronic map download request;
sending the new-version electronic map data to the business server cluster by the virtual cloud server cluster in response to the acquisition request; and
sending, by the business server cluster, the new-version electronic map data to the user terminal.

12. The method according to claim 11, wherein the method further comprises:
detecting, by business server cluster, whether the virtual cloud server cluster has updates of the electronic map data by polling the virtual cloud server cluster;
by the virtual cloud server cluster, when new new-version electronic map data is obtained by updating, sending the new new-version electronic map data to the business server cluster; and
by the business server cluster, when the new new-version electronic map data is received, sending prompt information to the user terminal, wherein the prompt information is used to prompt a terminal user to download the new new-version electronic map data, to update to the latest electronic map.

13. The method according to claim 11, wherein the electronic map service system further comprises a reverse proxy server cluster, and the business server cluster and the user terminal are connected in communication by the reverse proxy server cluster.

14. The method according to claim 13,
wherein the receiving, by the business server cluster, of the electronic map download request sent by the user terminal, comprises:
receiving, by the reverse proxy server cluster, the electronic map download request sent by the user terminal;
scheduling, by the reverse proxy server cluster, the electronic map download request to the target business server of the business server cluster according to a preset scheduling mechanism; and
receiving, by the target business server, the electronic map download request, and
wherein the sending of the acquisition request for the new-version electronic map data to the virtual cloud server cluster by the business server cluster in response to the electronic map download request comprises:
sending the acquisition request for the new-version electronic map data to the virtual cloud server cluster by the target business server in response to the electronic map download request; and
sending, by the business server cluster, the new-version electronic map data to the user terminal comprises:
sending, by the target business server, the new-version electronic map data to the reverse proxy server cluster; and sending, by the reverse proxy server cluster, the new-version electronic map data to the user terminal.

15. The method according to claim 11, wherein the method further comprises:
sending, by the business server cluster, a big data service request to the virtual cloud server cluster;
acquiring required relevant data from at least one of the mirror data by the virtual cloud server cluster in response to the big data service request;
performing, by the virtual cloud server cluster, data processing on the relevant data according to the big data service request, to obtain a processing result; and
sending, by the virtual cloud server cluster, the processing result to the business server cluster.

16. The method according to claim 15, wherein in response to the big data service request, acquiring required relevant data from at least one of the mirror data, comprises:
in response to the big data service request, acquiring required relevant data from at least one of the mirror data according to addresses and ports of the mirror data in a local area network to which the virtual cloud server cluster belongs.

17. The method according to claim 15, wherein the performing data processing on the relevant data comprises:
performing data analysis on the relevant data through a data analysis model;
and/or,
generating a visualization chart according to the relevant data.

18. An electronic map service system, wherein the electronic map service system comprises a backend development device and a virtual cloud server cluster, the backend development device is a terminal used by an electronic map developer for backend development of the electronic map, and the backend development device is connected to the virtual cloud server cluster in communication;

the backend development device is configured for acquiring target electronic map data to be updated; sequentially generating mirror data at different development stages corresponding to the target electronic map data; and sequentially publishing the mirror data to the virtual cloud server cluster, wherein mirror data at the last development stage in the mirror data constitute new-version electronic map data, other mirror data in the mirror data except for the mirror data at the last development stage constitute old-version electronic map processing data;

the virtual cloud server cluster is configured for generating identification information corresponding to each of the mirror data, wherein the identification information is used to distinguish different mirror data.

19. The electronic map service system according to claim 18, wherein the electronic map service system further comprises a business server cluster, and the virtual cloud server cluster and the business server cluster are connected in communication;

the business server cluster is configured for sending a computing service request to the virtual cloud server cluster;

the virtual cloud server cluster is further configured for, in response to the computing service request, acquiring relevant data required for computation from at least one of the mirror data; performing data analysis and processing on the relevant data according to the computing service request, to obtain an analysis result; and sending the analysis result to the business server cluster.

20. The electronic map service system according to claim 19, wherein the electronic map service system further comprises a reverse proxy server cluster, the business server cluster comprises a plurality of business servers, and the reverse proxy server cluster and each of the plurality of business servers are connected in communication; and the reverse proxy server cluster is configured for scheduling a request sent by a user terminal to one of the plurality of business servers of the business server cluster according to a preset scheduling mechanism.

* * * * *